(12) United States Patent
Dayan et al.

(10) Patent No.: US 6,711,690 B2
(45) Date of Patent: Mar. 23, 2004

(54) SECURE WRITE BLOCKING CIRCUIT AND METHOD FOR PREVENTING UNAUTHORIZED WRITE ACCESS TO NONVOLATILE MEMORY

(75) Inventors: Richard Alan Dayan, Wake Forest, NC (US); Steven Dale Goodman, Raleigh, NC (US); Joseph Michael Pennisi, Apex, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 09/953,775

(22) Filed: Sep. 17, 2001

(65) Prior Publication Data
US 2003/0056070 A1 Mar. 20, 2003

(51) Int. Cl.[7] .............................. G06F 9/00; H04L 9/00
(52) U.S. Cl. ........................ 713/202; 711/164
(58) Field of Search .................... 713/202; 711/163, 711/164

(56) References Cited
U.S. PATENT DOCUMENTS

| | | | |
|---|---|---|---|
| 5,721,877 A | * | 2/1998 | Heflinger et al. ............ 711/163 |
| 5,835,594 A | | 11/1998 | Albrecht et al. |
| 5,887,131 A | | 3/1999 | Angelo |
| 6,122,732 A | | 9/2000 | Ahuja |

OTHER PUBLICATIONS

IEEE; Graphics Symbols for Logic Functions (IEEE Std 91a–1991 and IEEE Std 91–1984); © 1991, pp. 74–75.*

* cited by examiner

Primary Examiner—David L. Robertson
(74) Attorney, Agent, or Firm—Bracewell&Patterson LLP

(57) ABSTRACT

A secure write blocking circuit and method of operation thereof. The secure write blocking circuit includes enable and disable block input terminals coupled to a blocking circuit. The blocking circuit, such as a set/reset latch in a preferred embodiment, generates a block signal to prevent write access to a nonvolatile memory device, such as flash memory, in response to signals provided to the enable and disable input terminals. The secure write blocking circuit also includes an interrupt generator, coupled to the disable block input terminal, that generates an interrupt signal in response to a signal at the disable input terminal. In a related embodiment the secure write blocking circuit also includes a logic circuit, coupled to the blocking circuit, that receives the block signal and a write enable signal and in response thereto generates a control signal to a write enable input of the nonvolatile memory device.

17 Claims, 4 Drawing Sheets

SECURE WRITE BLOCKING CIRCUIT AND METHOD FOR PREVENTING UNAUTHORIZED WRITE ACCESS TO NONVOLATILE MEMORY

BACKGROUND OF THE INVENTION

1. Technical Field

The present invention relates in general to data processing systems and in particular, to securing access to data in nonvolatile memory. More particularly, the present invention relates to a secure write blocking circuit and method for preventing unauthorized write access to nonvolatile memory.

2. Description of the Related Art

Firmware is software codes that generally reside in a piece of hardware and are responsible for an integral portion of the hardware function and are generally treated as being a component of the hardware. Typically, firmware is stored as binary information in some form of nonvolatile memory component, in which binary can be represented in hexadecimal, octal and other number bases. The components of firmware may be executable programs, such as power-on self test (POST), Basic Input/Output Software (BIOS), configuration utilities, etc., or it may be data tables, e.g., a description of the geometry of a hardfile, register values to use with a universal asynchronous receiver-transmitter (UART) to produce different baud rates, etc. Firmware is typically stored in a special type of memory chip that doesn't lose its storage capabilities when power is removed or lost. Examples of nonvolatile storage devices used for storing firmware include ROMs, PROMs, EPROMs and EEPROMs. ROMs (read only memories) are programmed at the "factory," i.e., by the ROM manufacturer utilizing information provided by a customer. PROMs (programmable read only memories) are programmed by a technician utilizing a programming console. Once a ROM or a PROM is programmed, the firmware it contains cannot be changed. To update the firmware, the ROM or PROM must be physically removed from the device and replaced with a new ROM or PROM that contains the upgraded firmware. Improvements in memory device technologies have rendered variations of the PROM, such as erasable programmable read only memory (EPROM), which may be erased and reprogrammed after removing the device from a circuit, and electrically erasable programmable read only memory (EEPROM) devices, which can be erased utilizing electrical signals without the need to remove them from a circuit. These EEPROM devices are commonly implemented using "flash" memory devices.

A computer system's, such as a personal computer (PC), system BIOS is routinely stored in flash memory rather than a basic ROM to allow the BIOS to be more easily updated should the need arise. All products generally experience a number of firmware revisions that correct firmware defects, compensate for hardware or operating system errors or introduce new features. However, the ability to update the system BIOS without having to remove the memory device that it resides in from the system has created opportunities for denial of service and other "attacks" by unauthorized entities. For example, an unauthorized user may erase the flash memory resulting in an inoperable device or may replace the existing BIOS with a modified BIOS that circumvents user authentication and data protection mechanisms. Conventional approaches to protecting the flash memory from unauthorized access may utilize a processor's general purpose input/output (GPIO) terminals to block the write signal to the flash memory or utilize the GPIO to control a write protect input to the flash memory device. While these protection schemes do provide some level of protection, a determined individual, such as a hacker, can identify the particular GPIO utilized to block access to the flash memory and simply configure the GPIO to the state which will allow access to the flash memory.

Accordingly what is needed in the art is an improved access security scheme that mitigates the limitations discussed above. More particularly, what is needed in the art is a secure write access blocking circuit that generates an unmaskable interrupt when write access is enabled.

SUMMARY OF THE INVENTION

To address the above discussed deficiencies in the prior art, and in accordance with the invention as embodied and broadly described herein, a secure write blocking circuit is disclosed. The secure write blocking circuit includes enable and disable block input terminals coupled to a blocking circuit. The blocking circuit, such as a set/reset latch in a preferred embodiment, generates a block signal to prevent write access to a nonvolatile memory device, such as flash memory, in response to signals provided to the enable and disable input terminals. The secure write blocking circuit also includes an interrupt generator, coupled to the disable block input terminal, that generates an interrupt signal in response to a signal at the disable input terminal. In a related embodiment the secure write blocking circuit also includes a logic circuit, coupled to the blocking circuit, that receives the block signal and a write enable signal and in response thereto generates a control signal to a write enable input of the nonvolatile memory device.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
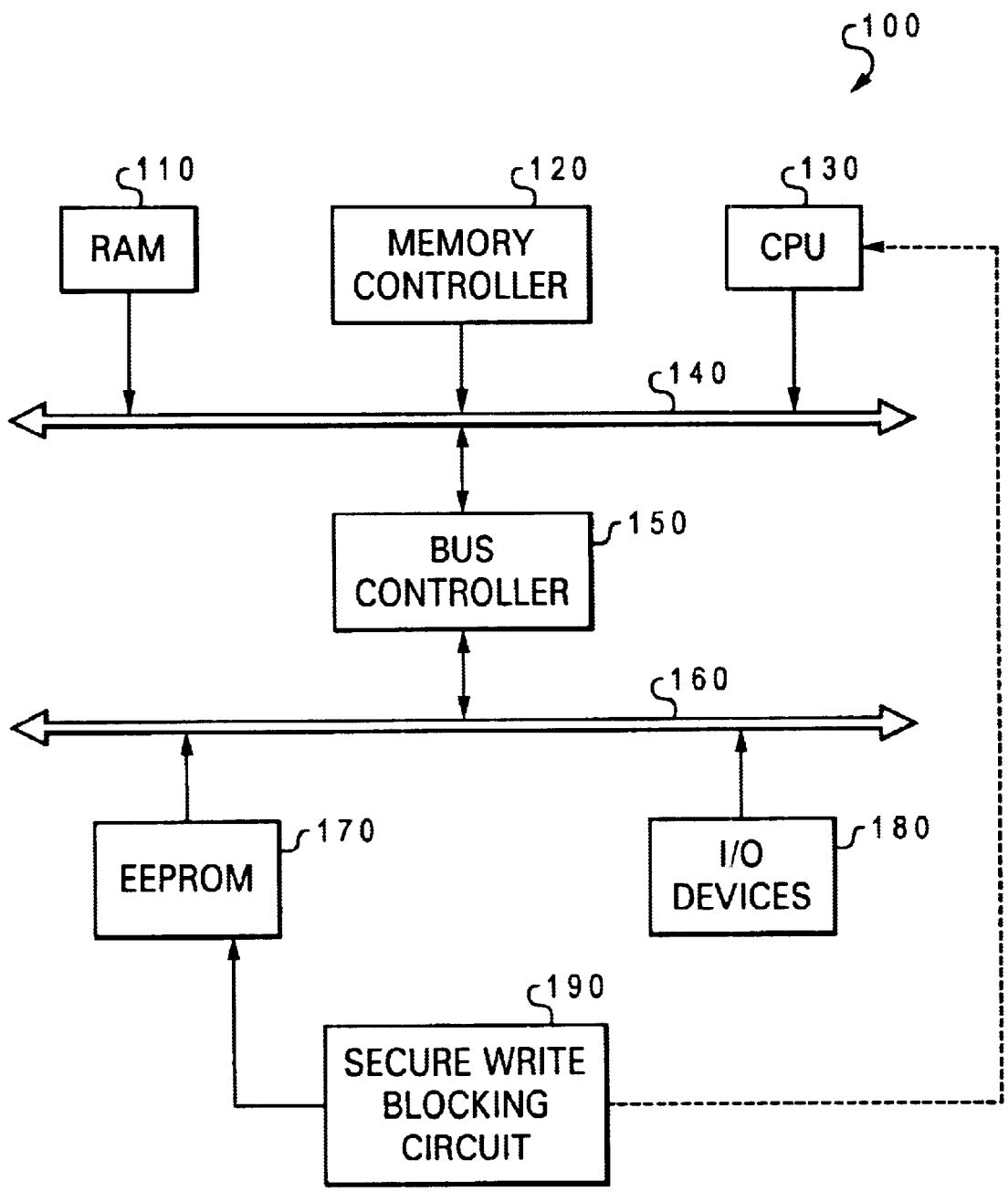
FIG. 1 illustrates a simplified high-level block diagram of a data processing system utilizing a secure write blocking circuit according to the principles disclosed by the present invention.

With reference now to the figures and in particular with reference to FIG. 1, there is depicted a simplified high-level block diagram of a data processing system 100 utilizing a secure write blocking circuit 190 according to the principles disclosed by the present invention. As shown in the illustrated embodiment, data processing system 100, e.g., a personal computer, includes a random access memory (RAM) 110, memory controller 120 and a central processing unit (CPU) 130 that are interconnected utilizing a system bus 140. A bus controller 150 provides a means for arbitrating the data flow between system bus 140 and an input/output bus 160. Data processing system 100 also includes a plurality of I/O devices, generally designated 180, such as disk drives and network cards, and a read only memory (ROM) device, such as an electrically erasable programmable read only memory (EEPROM) 170, also commonly implemented using "flash" memory devices, where system's 100 firmware typically resides. It should be noted that although data processing system 100 has been described in the context of a computer system, the present invention does not contemplate limiting its practice to this one particular embodiment. The present invention may be advantageously practiced in any system and/or device, such as ethernet cards, that utilizes firmware residing in a flash memory device in its setup and operational phases. Data processing system 100 also includes a secure write blocking circuit 190 that is coupled to the flash memory, i.e., EEPROM 170. The construction and operation of secure write blocking circuit 190 will hereinafter be described in greater detail in conjunction with FIGS. 2, 3 and 4, with continuing reference to FIG. 1.

Figure 2:
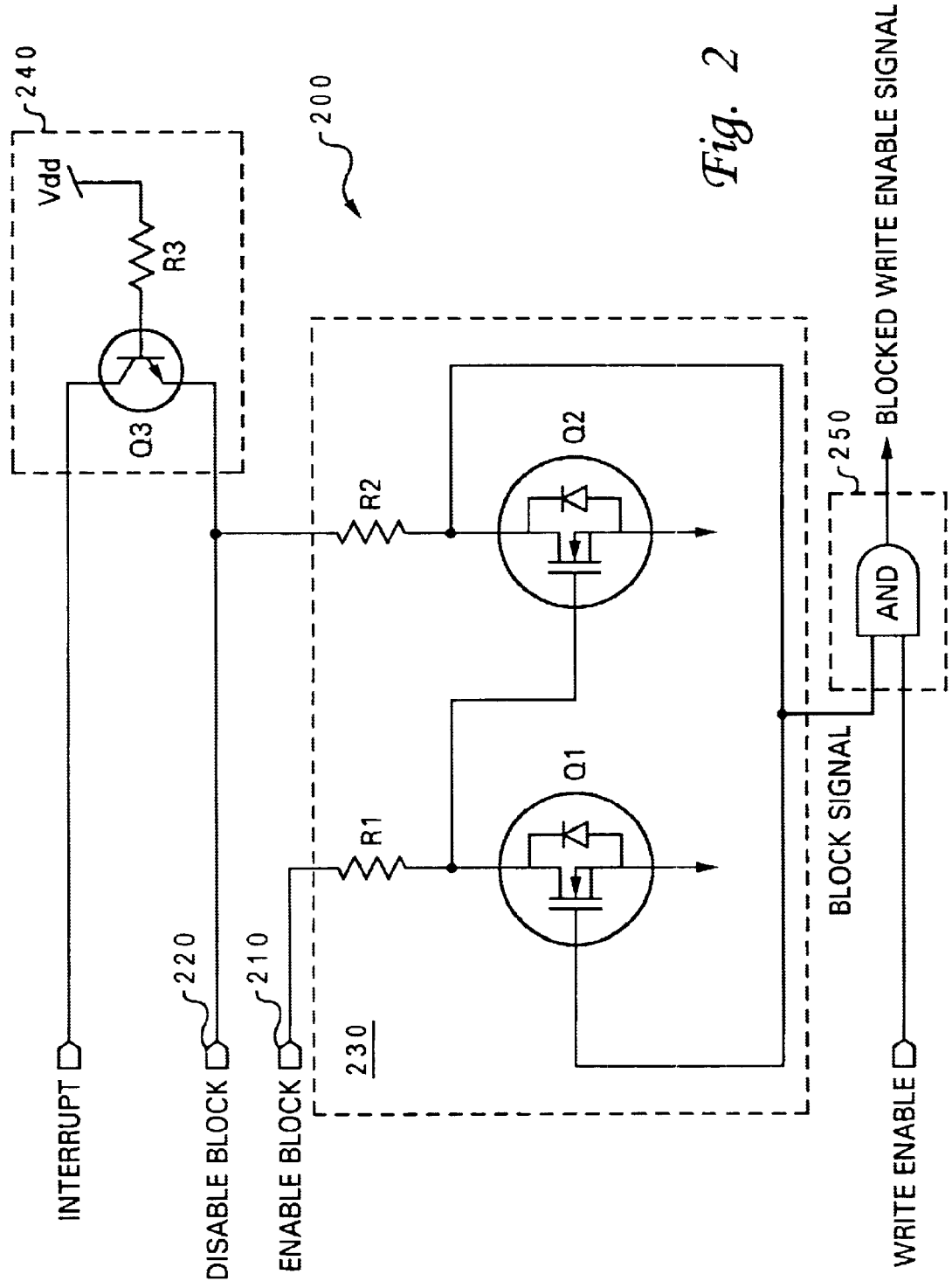
FIG. 2 illustrates a simplified schematic diagram of an embodiment of a secure write blocking circuit according to the present invention.

Referring now to FIG. 2, there is illustrated a simplified schematic diagram of an embodiment of a secure write blocking circuit 200 according to the present invention. Secure write blocking circuit 200 includes enable and disable block input terminals 210, 220 coupled to a blocking circuit 230 that, in turn, is coupled to a logic circuit 250. As illustrated in the depicted embodiment, disable block input terminal 220 is also coupled to an interrupt generator 240. Interrupt generator 240 includes a third switching device Q3, a conventional transistor is utilized in the preferred embodiment, coupled to a power source Vdd through a third resistance R3. In the event that an unblock signal is provided to disable block input terminal 220, interrupt generator 240 will generate an unmaskable interrupt signal to the processor, i.e., CPU 130, to initiate a system management interrupt (SMI) handler routine to verify that the write access to the flash memory is authorized. In a preferred embodiment, enable and disable block input terminals 210, 220 are coupled to general purpose input/output (GPIO) terminals of a service processor, e.g., CPU 130.

Blocking circuit 230, in a preferred embodiment, is a set/reset latch that includes a first switching device Q1, an n-channel metal-oxide-semiconductor field-effect transistor (MOSFET) is shown in the illustrated embodiment, coupled to enable block input terminal 210 via a first resistance R1. A second resistance R2 couples a second switching device Q2 to disable block input terminal 220. The two inputs, i.e., enable and disable block input terminals 210, 220, to the set/reset latch control the state of blocking circuit 200. Blocking circuit 230 also generates an output signal to logic circuit 250 to block write access to a flash memory device (analogous to EEPROM 170 in FIG. 1). As shown in the illustrated embodiment, the output signal from blocking circuit 230 is combined with a flash write enable signal utilizing a logical operation (an AND logic gate is depicted) to generate a blocked write enable signal to control a write protect input to the flash memory device. Although, the output signal from blocking circuit 230 is utilized in the illustrated embodiment, along with a flash write enable signal, to provide secure write access to the flash memory device, the present invention does not contemplate limiting its practice to this one specific implementation. Those skilled in the art should readily appreciate that the output from blocking circuit 230 may also be utilized, in other advantageous embodiments, to control access to the flash memory device, for example, the output signal may be directly connected to the write protect input of the flash memory device or, alternatively, the output signal may be utilized to control a power source to the flash memory device, effectively powering down the flash memory device in the event of an "unauthorized" access.

To unblock write access to the flash memory device, an update program, e.g., a conventional flash update utility, would issue an unblock request that includes a proof of authorization to the SMI interrupt handler routine that has been initiated when an unblock signal has been provided to disable block input terminal 220. The interrupt handler routine will verify the authorization and unblock write access to the flash memory device by setting the signal at disable block input terminal 220 to a low state while, at the same time, keeping the signal at enable block input terminal 210 at a high state utilizing the GPIOs. The interrupt handler routine, having previously determined that the unblock operation is authorized, will then return the disable block signal at disable block input terminal 220 to a high state. This, in turn, will turn off third switching device Q3, removing the interrupt signal and thus prevent re-entry in the interrupt handler routine once it exits. Following the authorized unblocking of the write access to the flash memory device, the interrupt handler routine will exit, allowing the update flash program to change the contents of the flash memory device. Upon completion of updating the flash memory device, the update program may either re-block the write access to the flash memory device or issue a block request to the interrupt handler. In either case, blocking circuit 230 would be reset by setting the enable block signal to the enable block input terminal 210 low utilizing the GPIO.

In the event that an unauthorized write access to the flash memory device is encountered, i.e., signal at disable block input terminal 220 set to a low state, interrupt generator 240 will generate an interrupt that, in an advantageous embodiment, is a system management interrupt (SMI) to CPU 130. CPU 130, in turn, will acknowledge the interrupt and, before the next instruction cycle in an advantageous embodiment, pass control to the interrupt handler routine associated with that interrupt. The interrupt handler routine then examines a GPIO register to determine that the interrupt was caused by an unauthorized unblocking of the write access to the flash memory device. Consequently, the interrupt handler routine will return the signal at disable block input terminal 220 to a high state and set the signal at the enable block input terminal 210 to a low state, thus re-enabling the block on the write access to the flash memory device and removing the cause of the interrupt. Following which, the interrupt handler routine will exit, restoring normal operation. Any further attempts to unblock the write access to the flash memory device will repeat the above described process. In another advantageous embodiment, the interrupt handler routine will also log the unauthorized write access attempt and report the incident.

Figure 3:
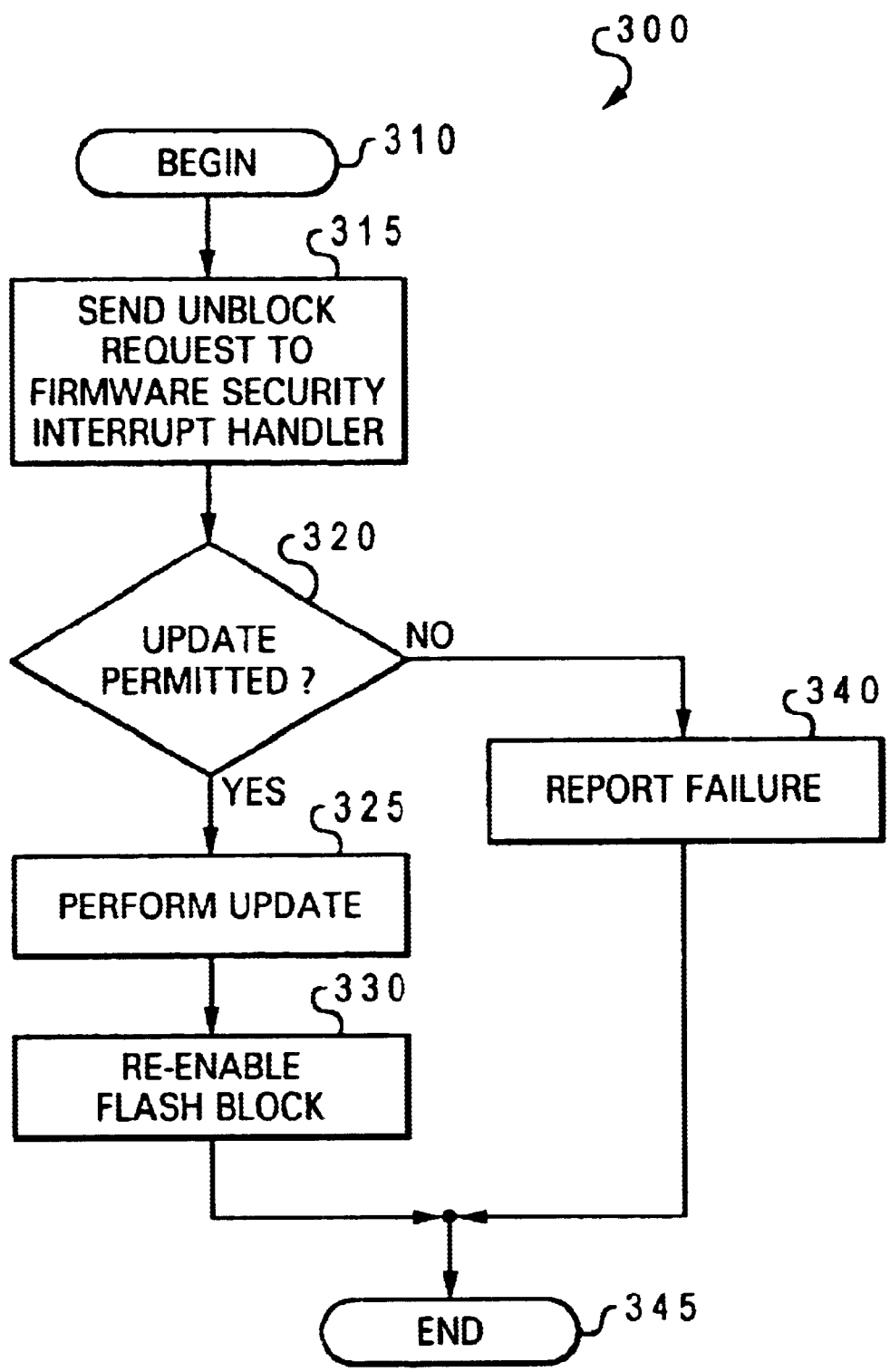
FIG. 3 illustrates a high-level process flow of an embodiment of a secure firmware upgrade utility (flash utility) according to the principles disclosed by the present invention.

Referring now to FIG. 3, there is depicted a high-level process flow of an embodiment of a secure firmware upgrade utility (flash utility) 300 according to the principles disclosed by the present invention. Process 300 is initiated, as depicted in step 310, for example, an administrator or servicer has decided to upgrade the firmware to a new level and has invoked a flash-upgrade utility that is well-known in the art and made new firmware (flash image) available to the program. Upgrading firmware may result when a device, such as a service processor, has undergone a design upgrade incorporating new components and/or additional functionality or from a desire to fix a software defect in a current release of the firmware or the release of a new software feature.

Following initialization, the flash utility program sends a request to unblock the flash memory device to a firmware security interrupt handler, as illustrated in step 315. This request may include an authorization code, such as a password, that the firmware security interrupt handler will validate as proof that the requester is authorized to perform a firmware update (the security function processing will be described in greater detail hereinafter with reference to FIG. 4). Following processing of the unblock request by the firmware security function, the flash utility program will examine the results of the request as depicted in decisional step 320. If it is determined in decisional step 320 that the secure write blocking circuit 200 was set the unblocking state by the firmware security interrupt handler, the flash utility program will proceed to update the firmware as illustrated in step 325. Following firmware update, as illustrated in step 330, the flash utility program will block further write access to the flash memory device by manipulating the enable block signal to secure write blocking circuit 200 or, alternatively, by issuing a request to the firmware security handler to block write access to the flash memory device. Following which, process 300 exits as depicted in step 345. However, if the flash utility program determines at decisional step 320 that the firmware security interrupt handler did not permit write access to the flash memory device, the flash utility program will report the failure, as illustrated in step 340, and exits in step 345.

Figure 4:
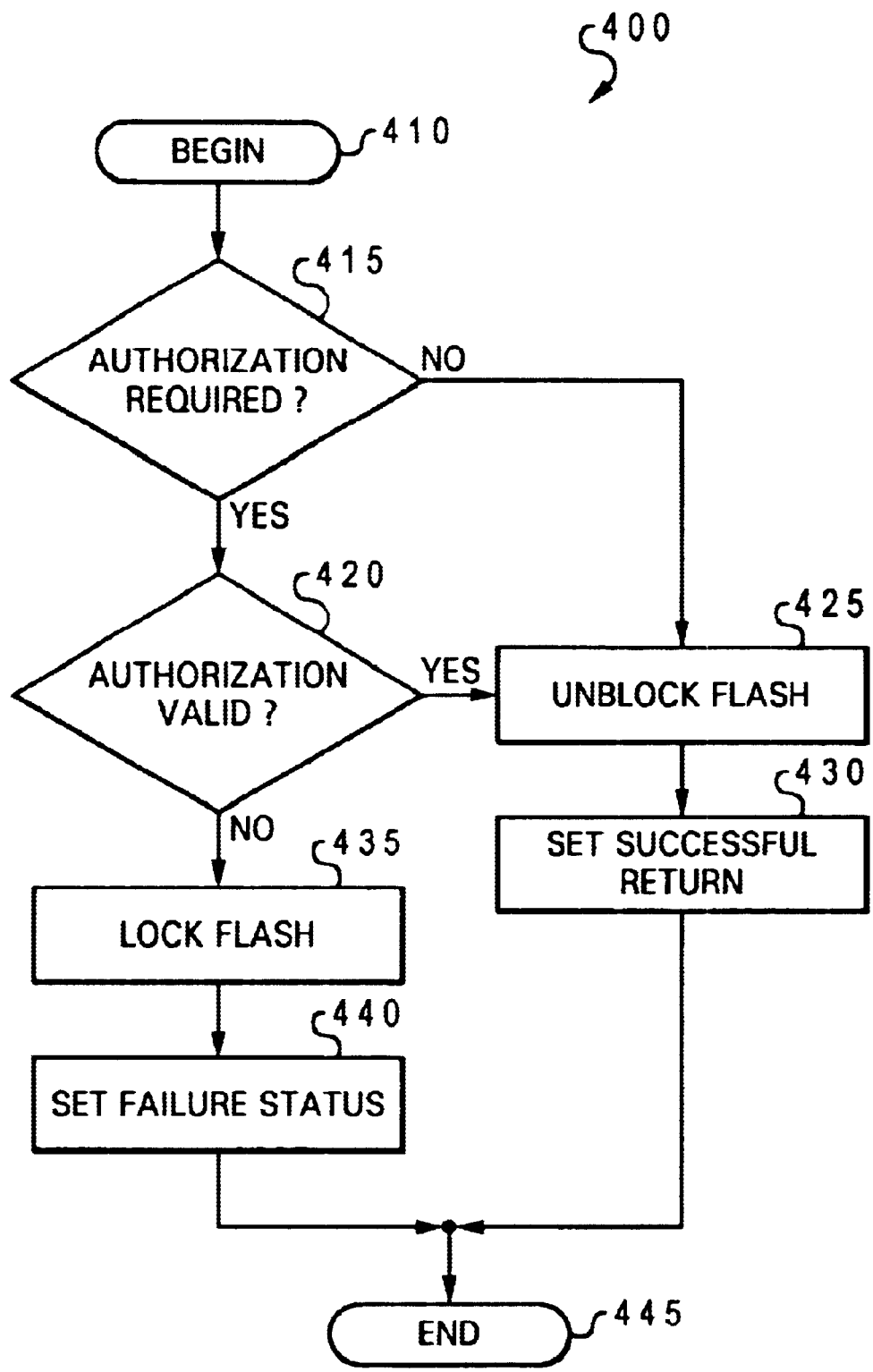
FIG. 4 illustrates a high-level process flow of an embodiment of the unblock request processing function of the firmware security interrupt handler according to the present invention.

Referring now to FIG. 4, there is illustrated a high-level process flow of an embodiment of the unblock request processing function 400 of the firmware security interrupt handler according to the present invention. It should be noted that this function must be protected from any unauthorized access (read or write). As such, a preferred embodiment of this function is to incorporate this function into a system management mode (SMM) processing function of, e.g., a personal computer. Process 400 is initiated by the receipt of a request to permit write access to the flash memory device, as depicted in step 410. Subsequently, as illustrated in decisional step 415, process 400 determines if authorization is required to permit write access. If no authorization is required, process 400 proceeds to unblock the flash memory device, as illustrated in step 425, by manipulating the disable block signal as previously described. Following which, process 400 sets the unblock successful status, as depicted in step 430, and returns the status to the flash utility program, as shown in step 445. If, however, process 400 determines at decisional step 415 that authorization is required, process 400 proceeds to check the authorization that was provided as part of the request, as illustrated in step 420. In the event that the authorization is valid, process 400 proceeds to unblock the flash memory device as described previously. On the other hand, if process 400 determines at decisional step 420 that the authorization is invalid, process 400 proceeds to ensure that the flash memory device is locked, as depicted in step 435, by manipulating the enable block signal to secure write blocking circuit 200. Following which, process 400 proceeds to set a failure status, as illustrated in step 440, that is returned to the flash utility program as shown in step 445.

In an advantageous embodiment, the method for securely unblocking write access to a nonvolatile memory device disclosed by the present invention is implemented as a computer executable software program. As depicted in FIG. 1, the present invention may be implemented within an exemplary data processing unit, e.g., data processing system 100, that may be embodied as a personal computer, or alternatively as a computer workstation platform, such as IBM's RS/6000. It should be noted that although the present invention has been described, in one embodiment, in the context of a data processing system, those skilled in the art will readily appreciate that the present invention described hereinabove may be implemented, for example, by other suitable electronic module to execute a corresponding sequence of machine-readable instructions. These instructions may reside in various types of signal-bearing media. In this respect, one aspect of the present invention concerns a programmed product, that includes signal-bearing media tangibly embodying a program of machine-readable instructions executable by a digital data processor to perform the secure firmware upgrade process described above. The present invention does not contemplate limiting its practice to any particular type of signal-bearing media, i.e., computer-readable medium, utilized to actually carry out the distribution. Examples of signal-bearing media includes recordable type media, such as floppy disks, hard disk drives and flash memory, and transmission type media such as digital and analog communication links and wireless.

While the invention has been particularly shown and described with reference to a preferred embodiment, it will be understood by those skilled in the art that various changes in form and detail may be made therein without departing from the spirit and scope of the invention.

What is claimed is:

1. A secure write blocking circuit for preventing unauthorized write access to a nonvolatile memory device, comprising:

an enable block and a disable block input terminals;

a blocking circuit, coupled to said enable and disable input terminals, that generates a block signal to prevent write access to said nonvolatile memory device in response to signals provided to said enable and disable input terminals, wherein said blocking circuit includes first and second switching devices configured as a set/reset latch, and first and second resistances coupled to said first and second switching devices, respectively; and an interrupt generator, coupled to said disable block input terminal, that generates an interrupt signal in response to a signal at said disable input terminal.

2. The secure write blocking circuit as recited in claim 1, wherein said nonvolatile memory device is flash memory.

3. The secure write blocking circuit as recited in claim 1, further comprising a logic circuit, coupled to said blocking circuit, that receives said block signal and a write enable signal and generates, in response thereto, a control signal to a write enable input of said nonvolatile memory device.

4. The secure write blocking circuit as recited in claim 3, wherein said logic circuit performs a logical AND operation.

5. The secure write blocking circuit as recited in claim 1, wherein said interrupt signal initiates a system management interrupt (SMI).

6. The secure write blocking circuit as recited in claim 1, wherein said interrupt generator includes a third switching device and a third resistance.

7. A method for securely unblocking write access to a nonvolatile memory device, comprising:
- receiving a disable signal to disable a write block signal to said nonvolatile memory device;
- generating an interrupt in response to said disable signal such that a processor receiving said interrupt is set to operate in a system management mode;
- verifying that said disable signal is authorized;
- resetting said interrupt such that said processor receiving said interrupt is set to operate in a standard operational mode; and
- following the resetting step, allowing write access to said nonvolatile memory device in response to said verification that said disable request is authorized, otherwise reenabling said write block signal to said nonvolatile memory device.

8. A data processing system, comprising:
- a processor;
- a nonvolatile memory, coupled to said processor; and
- a secure write blocking circuit, coupled to said nonvolatile memory, that prevents unauthorized write access to said nonvolatile memory, including:
  - an enable block and a disable block input terminals;
  - a blocking circuit, coupled to said enable and disable input terminals, that generates a block signal to prevent write access to said nonvolatile memory in response to signals provided to said enable and disable block input terminals, wherein said blocking circuit includes first and second switching devices configured as a set/reset latch, and first and second resistances coupled to said first and second switching devices, respectively; and
  - an interrupt generator, coupled to said disable block input terminal, that generates an interrupt signal in response to a signal at said disable block input terminal.

9. The data processing system as recited in claim 8, wherein said nonvolatile memory is a flash memory device.

10. The data processing system as recited in claim 8, wherein said secure write blocking circuit further includes a logic circuit, coupled to said blocking circuit, that receives said block signal and a write enable signal and generates, in response thereto, a control signal to a write enable input of said nonvolatile memory.

11. The data processing system as recited in claim 10, wherein said logic circuit performs a logical AND operation.

12. The data processing system as recited in claim 8, wherein said interrupt signal initiates a system management interrupt (SMI).

13. The data processing system as recited in claim 8, wherein said interrupt generator includes a third switching device and a third resistance.

14. A computer-readable medium having stored thereon computer executable instructions for implementing a method for securely unblocking write access to a nonvolatile memory device, said computer executable instructions when executed perform the steps of:
- receiving a request to disable a secure write blocking circuit, wherein said request includes a proof of authorization;
- generating an interrupt in response to said disable request such that a processor receiving said interrupt is set to operate in a system management mode; and
- verifying that said disable request is authorized;
- disabling a write block signal to said nonvolatile memory device;
- resetting said interrupt such that said processor receiving said interrupt is set to operate in a standard operational mode; and
- following said step of resetting, allowing write access to said nonvolatile memory device in response to said verification that said disable request is authorized, otherwise reenabling said write block signal to said nonvolatile memory device.

15. The computer-readable medium as recited in claim 14, wherein said nonvolatile memory device is a flash memory.

16. The computer-readable medium as recited in claim 14, wherein said generating an interrupt includes generating a system management interrupt.

17. The computer-readable medium as recited in claim 14, wherein said proof of authorization includes a password.

* * * * *